United States Patent
Satou

(10) Patent No.: US 10,040,428 B2
(45) Date of Patent: Aug. 7, 2018

(54) WIPER BLADE

(71) Applicant: NIPPON WIPER BLADE CO., LTD., Kazo-shi (JP)

(72) Inventor: Masahiko Satou, Kazo (JP)

(73) Assignee: Nippon Wiper Blade Co., Ltd., Kazo-Shi, Saitama (JP)

( * ) Notice: Subject to any disclaimer, the term of this patent is extended or adjusted under 35 U.S.C. 154(b) by 247 days.

(21) Appl. No.: 14/442,679

(22) PCT Filed: Nov. 12, 2013

(86) PCT No.: PCT/JP2013/080581
§ 371 (c)(1),
(2) Date: May 13, 2015

(87) PCT Pub. No.: WO2014/077250
PCT Pub. Date: May 22, 2014

(65) Prior Publication Data
US 2016/0280187 A1    Sep. 29, 2016

(30) Foreign Application Priority Data

Nov. 14, 2012    (JP) .................................. 2012-250468

(51) Int. Cl.
*B60S 1/38*    (2006.01)
(52) U.S. Cl.
CPC ...... *B60S 1/3801* (2013.01); *B60S 2001/3815* (2013.01)

(58) Field of Classification Search
CPC ................. B60S 1/3801; B60S 2001/3815
USPC ............................................... 15/250.44
See application file for complete search history.

(56) References Cited

FOREIGN PATENT DOCUMENTS

| FR | 2744973 A1 * | 8/1997 | ............ B60S 1/3801 |
|---|---|---|---|
| JP | 2006-36051 A | 2/2006 | |
| JP | 2007-55589 A | 3/2007 | |
| JP | 4227052 B2 | 2/2009 | |
| WO | WO 2010/035794 A1 | 4/2010 | |

OTHER PUBLICATIONS

JP2006036051A (machine translation), 2006.*
FR2744973A1 (machine translation), 1997.*

* cited by examiner

*Primary Examiner* — Andrew A Horton
(74) *Attorney, Agent, or Firm* — Muncy, Geissler, Olds & Lowe, P.C.

(57) ABSTRACT

A wiper blade with a support assembly has a plurality of levers and housed by covers, which enhances the universality of the required parts and reduces the number of the required parts and thus, the cost of fabrication, while allowing the covers to follow the round contour of a surface to be wiped. The wiper blade includes a primary cover and secondary covers pivotally connected to the primary cover. Each of the secondary covers include a lever guide section through which a yoke lever is slidably movable in a direction longitudinally of the wiper blade.

7 Claims, 10 Drawing Sheets

WIPER BLADE

TECHNICAL FIELD

The present invention relates to a wiper blade (referred to as "design blade") with a support assembly composed of a plurality of levers and housed by covers.

BACKGROUND ART

A conventional wiper blade (referred to as "tournament type wiper blade") includes a support assembly composed of a plurality of pivotally connected levers and adapted to support a wiper blade by which a surface (for example, automotive windshield) is wiped. There has recently been proposed a wiper blade (or design blade) wherein a support assembly is composed of a plurality of levers and is housed by covers so as to improve the aesthetic appearance of the wiper blade.

Japanese patent No. 4227052 discloses one such design blade.

FIG. 10 shows a part of a wiper blade 101 as proposed by Japanese patent No. 4227052. As shown, the wiper blade 101 includes a support assembly to hold a wiper rubber 102. The support assembly is composed of a primary lever 103 and secondary levers 104. Also, the wiper blade 101 includes a cover assembly composed of a center cover 105 and side covers 106 and adapted to enclose the primary lever 103 and the secondary levers 104.

The secondary lever 104 is pivotally connected to the primary lever 103 through a connector pin 107. The primary lever 103 includes an extension 108 adjacent to the connector pin 107. The extension 108 extends from the distal end of the primary lever and has apertures 109. The side cover 106 includes protrusions 110. The protrusions 110 are engaged within the corresponding apertures 109 so that the side cover 106 is pivotally connected to the primary lever 103. The side cover 106 includes a distal end 111 to which the wiper rubber 102 is mounted.

With such an arrangement, when the wiper rubber 102 is deformed during wiping operation of the wiper blade 101, the side cover 106 is pivoted relative to the primary lever 103 to follow deformation of the wiper rubber 102.

CITATION LIST

Patent Literature

[PTL1]
Japanese Patent No. 4227052

SUMMARY OF INVENTION

Technical Problem

In the prior art wiper blade 101, the side cover 106 is connected to the primary lever 103. To that end, it is necessary to provide the primary lever 103 with the extension 108. As a result, the prior art wiper blade 101 requires the use of a specially designed lever, rather than an existing lever. This results in a decrease in the universality of the required parts and brings about an increase in the cost of fabrication.

A conventional tournament type wiper blade typically includes a support assembly composed of three different types of levers (primary lever, secondary levers and yoke levers). To prepare a design blade, all the levers need to be housed by covers. However, each lever should be accompanied by its own cover in order for the covers to better follow the round contour of a surface to be wiped (or follow deformation of the wiper rubber and the support assembly). This results in an increase in the number of the required parts and thus, the cost of fabrication.

In view of the foregoing, it is an object of the present invention to provide a wiper blade with a plurality of levers housed by covers, which enhances the universality of the required parts and reduces the number of the required parts and thus, the cost of fabrication, while allowing the covers to follow the round contour of a surface to be wiped.

Solution to Problem

The present invention provides a wiper blade which includes a wiper rubber for wiping a surface, a support assembly for supporting the wiper rubber and a cover assembly for enclosing at least a part of the support assembly, wherein the support assembly includes an upper lever and a lower lever pivotally connected to the upper lever, and the cover assembly includes an upper cover positioned to enclose at least a part of the upper lever and a lower cover positioned to enclose at least a part of the lower lever. The lower cover includes a lever guide section through which the lower lever is slidably movable in a direction longitudinally of the wiper blade.

The lower cover may be pivotally connected to the upper cover.

One side of the lower lever adjacent to the wiper rubber may be held in contact with the inner surface of the lever guide section. The other side of the lower lever remote from the wiper rubber may be spaced at a predetermined clearance from the inner surface of the lever guide section.

The lower lever may be provided at its distal end with a claw for holding the wiper blade. The claw may be spaced a predetermined distance from the lever guide section.

The lower cover and the support assembly may collectively define a space therebetween.

The support assembly may include a primary lever at a location intermediate the length of the wiper blade and secondary levers pivotally connected to the primary lever and yoke levers pivotally connected to the secondary levers. The primary lever and the secondary levers may collectively form the upper lever, and the yoke levers may form the lower lever.

The cover assembly may include a primary cover at a location intermediate the length of the wiper blade, and secondary covers located adjacent to opposite ends of the wiper blade. The primary cover and the second covers may form the upper and lower covers, respectively.

Advantageous Effects of Invention

According to the present invention, in the wiper blade (for example, wiper blade 1) with the support assembly (for example, support assembly 3) and the cover assembly (for example, cover assembly 4), the lever guide section (for example, lever guide section 36) is defined in the lower cover (for example, secondary cover 30) of the cover assembly so that the lower lever (for example, yoke lever 13) of the support assembly is slidably moved in a direction longitudinally of the wiper blade through the lever guide section. This feature enables movement of the lower lever to be transmitted to the lower cover through the lever guide section when the wiper blade (for example, wiper rubber 2) and the support assembly are deformed to follow the round contour of a surface to wiped while the wiper blade is swung over the surface. In other words, not just the cover assembly, but the entire wiper blade is deformable to conform to the curvature of a surface to be wiped.

As the lower cover is pivotally connected to the upper cover, no additional structural feature is required to connect the lower lever to the upper lever (for example, primary lever 11). This connection allows the use of an existing part as a lever and enhances the universality of the parts of the wiper blades, thereby bringing about a reduction in the cost of fabrication.

The cover assembly is composed, for example, of two different types of covers. This arrangement enables the cover assembly to conform to the curvature of a surface to be wiped (because the lower cover is pivotally movable relative to the upper cover). This feature contributes to a reduction in the number of the required parts and thus, the cost of fabrication if the support assembly is required to include more different types of levers.

One side of the lower lever adjacent to the wiper rubber is held in contact with the inner surface (for example, retainer plates 35) of the lever guide section, whereas the other side of the lower lever remote from the wiper rubber is spaced at a predetermined clearance from the inner surface (for example, the bottom of a recess 34) of the lever guide section. This feature enables movement of the lower lever to be transmitted to the lower cover through the lever guide section and avoids interference between the lower lever and the lever guide section.

The claw (for example, claw 17) of the lower lever is spaced a predetermined distance from the lever guide section. This space avoids interference between the claw and the lever guide section and ensures that both the lower lever and the lower cover are moved without any interference.

A space 37 is defined between the lower cover and the support assembly. This space avoids interference between the support assembly and the lower cover and ensures that both the support assembly and the lower cover are moved without any interference.

DESCRIPTION OF EMBODIMENT

The present invention will now be described, by way of example, with reference to the accompanying drawings.

Figure 1:
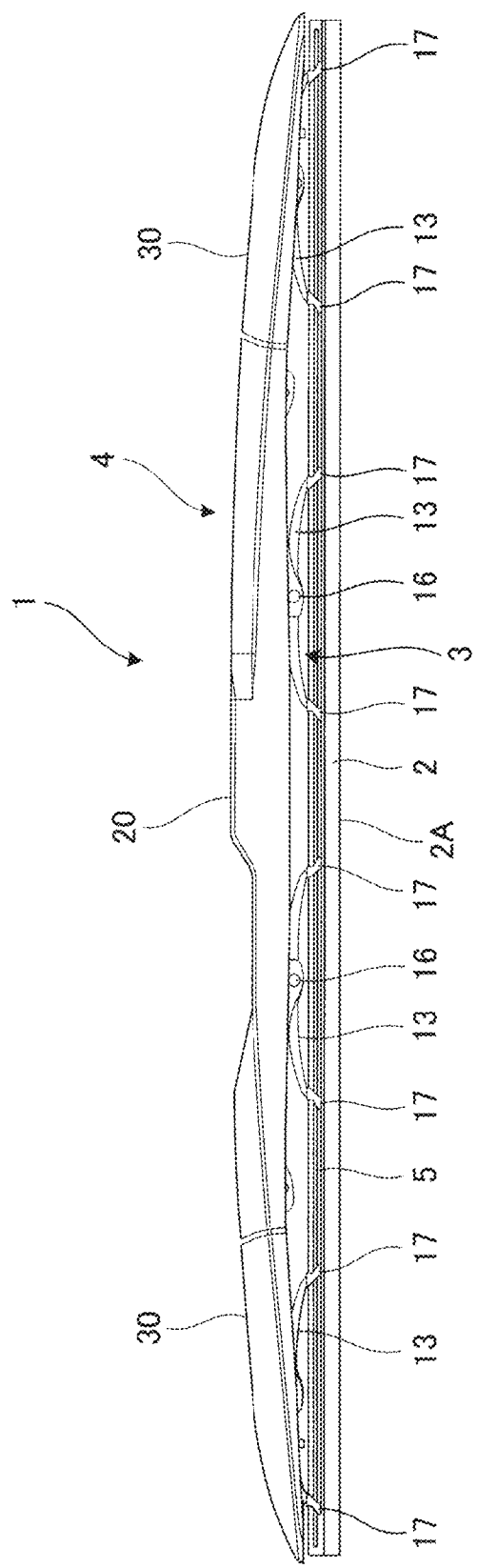
FIG. 1 is a side view showing the overall structure of a wiper blade according to one embodiment of the present invention.
Figure 2:
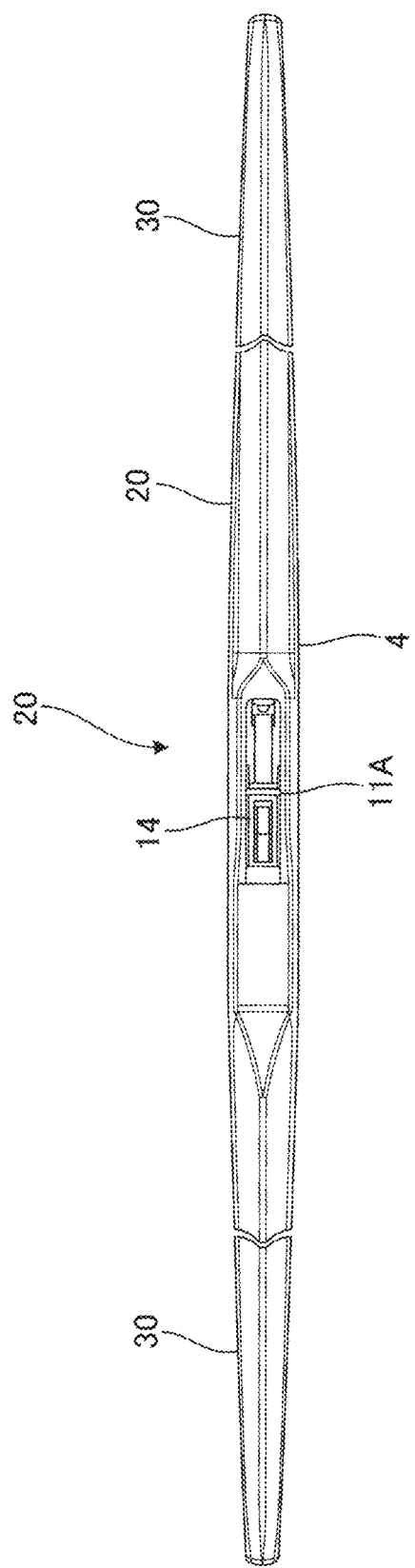
FIG. 2 is a plan view showing the overall structure of the wiper blade.
Figure 3:
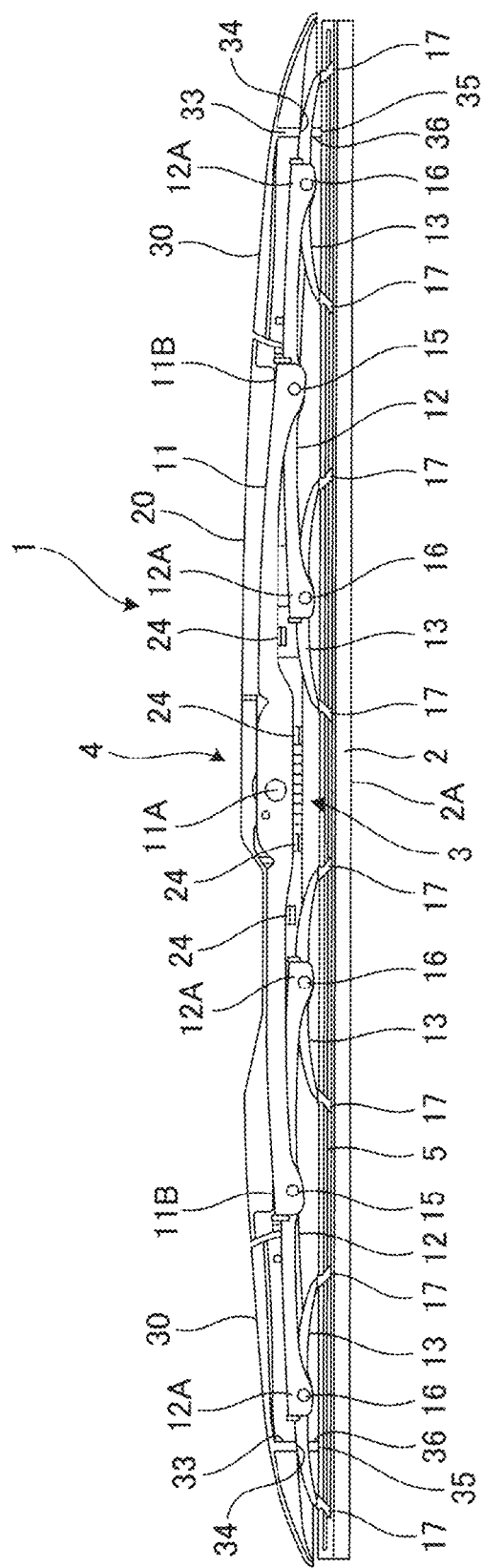
FIG. 3 is a side sectional view showing the overall structure of the wiper blade.

FIGS. 1 to 3 illustrate a wiper blade 1, in its entirety, according to the present invention. As shown, the wiper blade 1 includes a wiper rubber 2, a support assembly 3 for supporting the wiper rubber 2 and a cover assembly 4 positioned to enclose the support assembly 3.

The wiper rubber 2 serves to wipe an automobile windshield or other glass surfaces (not shown). The wiper rubber 2 is made of rubber and is in the form of an elongated member. The wiper rubber 2 is located at the lower end of the wiper blade 1. The wiper rubber 2 has a lower edge 2A. During wiping, the lower edge 2A of the wiper rubber 2A is pressed against a surface to be wiped while the wiper rubber 2 is swung over the surface.

The wiper rubber 2 is provided at its opposite sides with vertebrae 5. The vertebrae 5 extend in a direction longitudinally of the wiper rubber 2 and are in the form of metal plates. During wiping operation of the wiper rubber 2, the vertebrae 5 function to provide a uniformly distributed pressure to the surface along the length of the wiper rubber 2.

The support assembly 3 is composed of three different types of levers pivotally connected together. Specifically, the support assembly 3 includes a primary lever 11, two secondary levers 12 pivotally connected to opposite ends 11B of the primary lever 11, respectively and four yoke levers 13 pivotally connected to opposite ends 12A of the secondary levers 12, respectively. In this embodiment, each of the levers is made of metal.

The primary lever 11 is arranged at a location substantially intermediate the length of the wiper blade 1. The primary lever 11 includes a mounting pin 11A at a location substantially intermediate the length of the primary lever 11. A connector 14 is mounted to the mounting pin 11A for connection with a wiper arm, not shown.

The secondary levers 12 are longitudinally intermediately connected to the opposite ends 11B of the primary lever 11 by respective rivets 15 so that the secondary levers 12 are pivotable about the rivets 15 relative to the primary lever 11. Similarly, the yoke levers 13 are longitudinally intermediately connected to the opposite ends 12A of each of the secondary levers 12 by respective rivets 16 so that the yoke levers 13 are pivotable about the rivets 16 relative to the secondary levers 12. The yoke levers 16 are located at the lowermost end of the support assembly 3. Each of the yoke levers 16 is provided at its opposite ends with claws 17 by which the wiper rubber 2 and vertebrae 5 are held together.

In the support assembly 3, relative position of the levers (primary lever 11, secondary levers 12 and yoke levers 13) varies during pivotal motion of the levers. When the wiper rubber 2 is deformed to follow the round contour (curvature) of a surface to be wiped while the wiper blade 1 is swung over the surface, the support assembly 3 is deformed (or relative position of the levers are changed) with the wiper rubber 2. Again, both the wiper rubber 2 and the support assembly 3 are so deformable as to conform to the round contour of a surface to be wiped.

The cover assembly 4 is composed of a primary cover 20 and two secondary covers 30 arranged at opposite ends of the primary cover 20. The primary cover 20 is placed over the central region of the wiper blade 1. The primary cover 20 extends throughout the length of the primary lever 11 and encloses substantially the entirety of the primary lever 11. The secondary covers 30 are placed over opposite ends of the wiper blade 1, respectively. The secondary covers 30 enclose a part of the secondary levers 12 and a part of the yoke levers 13. In this embodiment, the primary cover 20 and the secondary covers 30 are both made of plastic.

Figure 4:
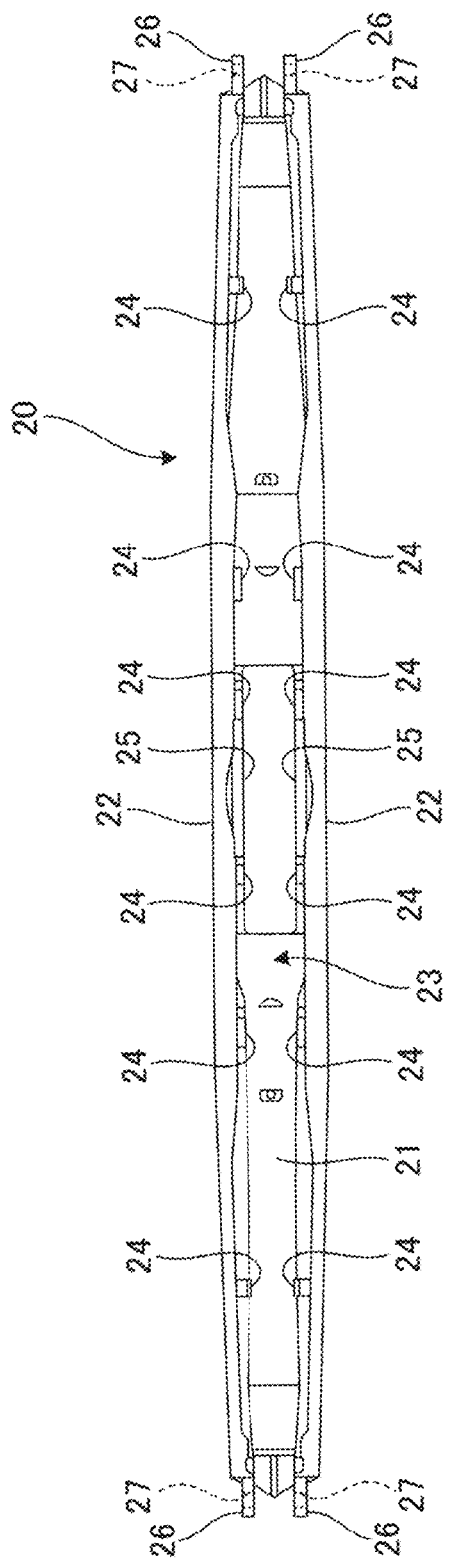
FIG. 4 is a bottom view of a primary cover used in the wiper blade.
Figure 5:
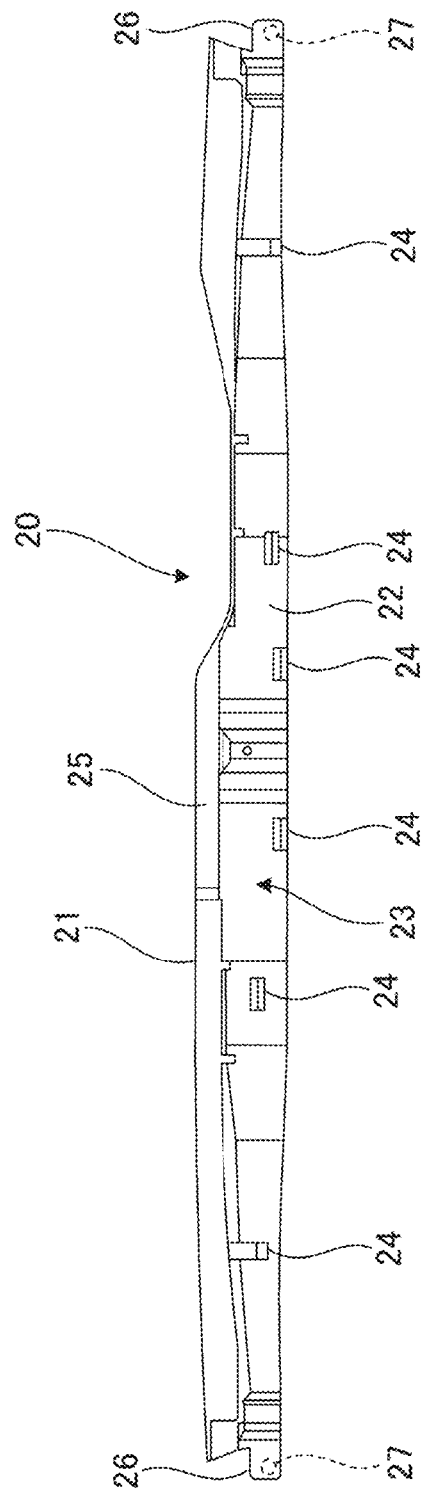
FIG. 5 is a side sectional view of the primary cover.

As shown in detail in FIGS. 4 and 5, the primary cover 20 is in the form of an enclosure of a predetermined shape and includes a top 21 and opposite side walls 22. The top 21 and the side walls 22 collectively define a channel 23 to receive the support assembly 3. Substantially the entirety of the primary lever 11 is housed within the channel 23. A plurality of projections 24 extend from the inner surface (one of the surfaces positioned to face the channel 23) of the side walls 22. The primary lever 11 is engaged with the projections 24 so that the primary lever 11 is held in position within the channel 23. The projections 24 thus prevent the primary lever 11 from dropping from the channel 23.

An opening 25 is longitudinally intermediately defined in the top of the primary cover 20. The central region (adjacent to the mounting pin 11A) of the primary lever 11 is positioned below the opening 25 when the primary lever 11 is mounted to the primary cover 20. This allows the wiper arm to be connected to the connector 14 from above the wiper blade 1.

In the secondary cover 20, a pair of connector elements 26 extend from each end of the side walls 22. Each of the connector elements 26 has an aperture 27 through which the secondary cover 30 is pivotally connected, as will be described later.

In FIGS. 4 and 5, the primary cover 20 is shown in a reverse relation to the illustrations of FIGS. 1 to 3.

Figure 6:
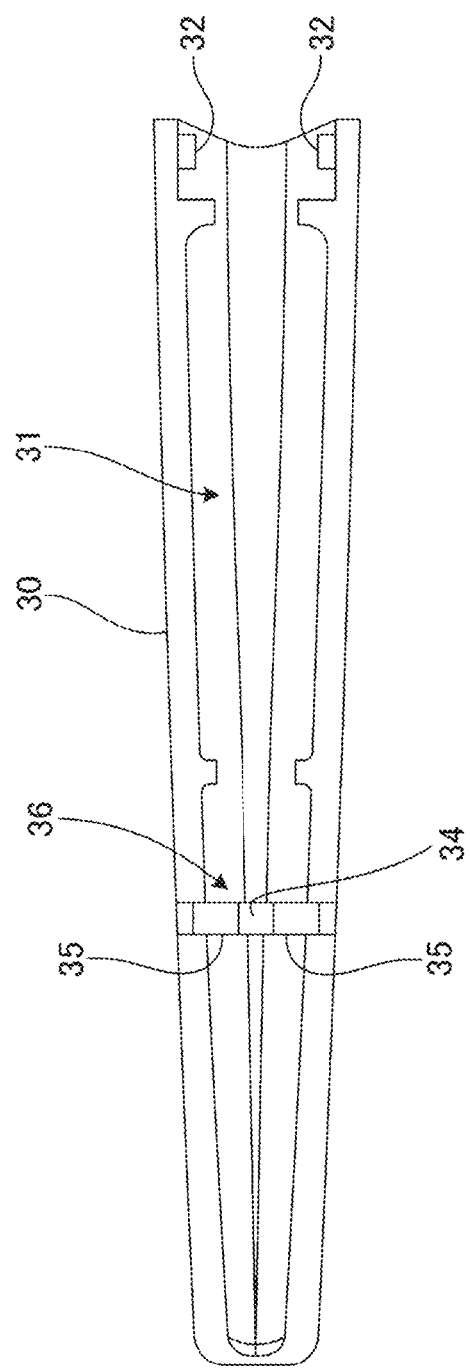
FIG. 6 is a bottom view of a secondary cover used in the wiper blade.
Figure 7:
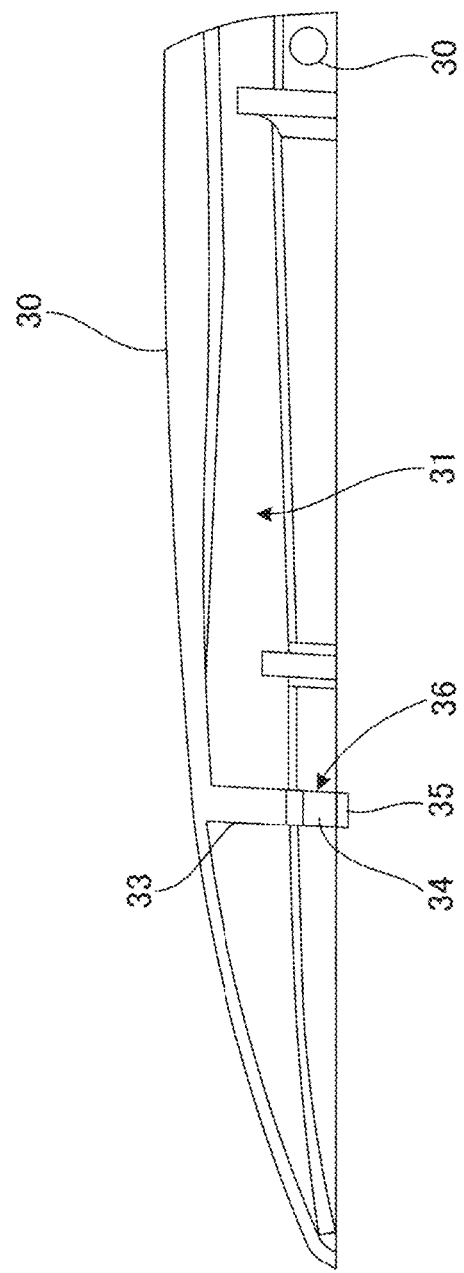
FIG. 7 is a side sectional view of the secondary cover.

As shown in detail in FIGS. 6 and 7, the secondary cover 30 is in the form of a streamlined enclosure. The height of the secondary cover 30 progressively decreases in a direction toward its distal end. A channel 31 is defined in the secondary cover 30 to receive the support assembly 3 (secondary lever 12 and a part of the yoke lever 13).

The secondary cover 30 has opposite side walls. A pair of projections or connector pins 32 extend inwardly from the side walls of the second cover 30 and are located at the proximal end of the second cover 30. The connector pins 32 are engaged within the corresponding apertures 27 of the primary cover 20 so that the secondary cover 30 is pivotally connected to the primary cover 20.

A rib 33 is formed in the channel 31 of the secondary cover 30 and includes a recess 34 at its lower end. The recess 34 has an inverted U-shape. A pair of retainer plates 35 extend horizontally inwardly from the lower ends of the recess 34. The recess 34 and the two retainer plates 35 collectively form a lever guide section 36 to surroundingly receive a part of the yoke lever 13.

Figure 8:
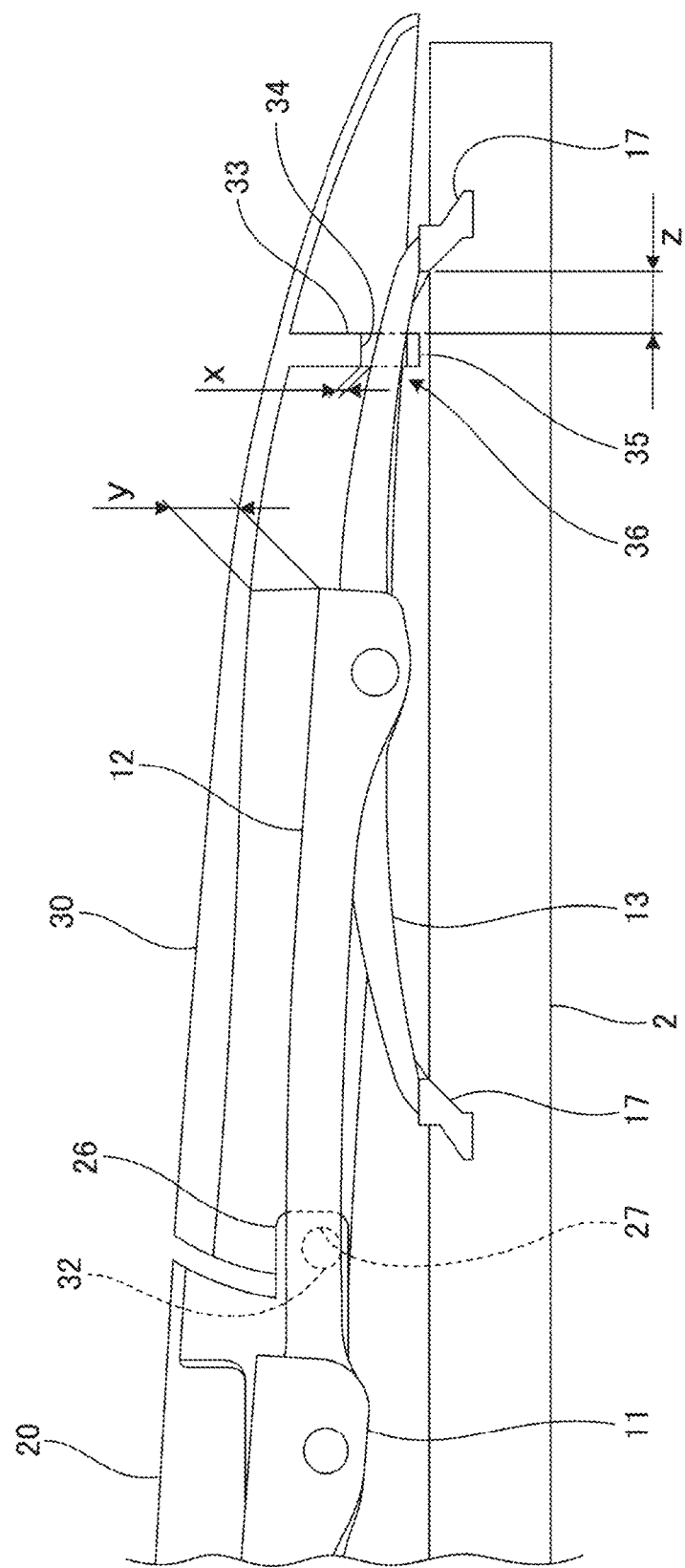
FIG. 8 is a fragmentary side sectional view of the wiper blade with a wiper rubber held in a horizontal position.
Figure 9:
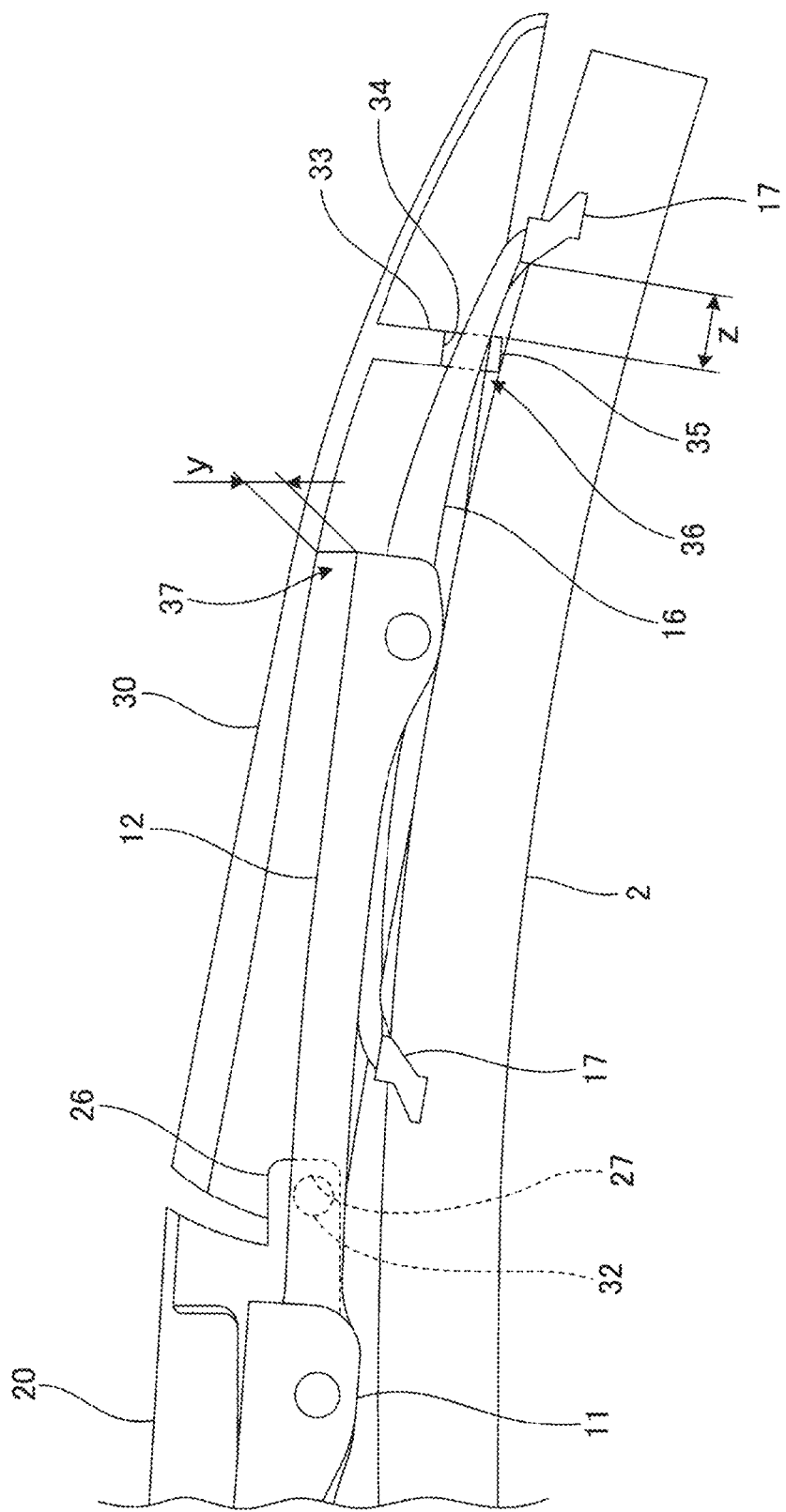
FIG. 9 is a fragmentary side sectional view of the wiper blade with the wiper rubber deformed to an arcuate shape.

FIG. 8 shows the distal end of the wiper rubber 2 held in its initial position (where the wiper rubber 2 extends along a substantially straight line). FIG. 9 shows the distal end of the wiper blade 2 when deformed into an arcuate shape. As shown, a part of the secondary lever 12 and the yoke lever 13 are housed in the secondary cover 30. The yoke lever 13 extends through the lever guide section 36 of the secondary cover 30. The retainer plates 35 prevent removal of the yoke lever 13 from the lever guide section 36. The yoke lever 13 is movable through the lever guide section 36 in a direction longitudinally of the wiper blade 1.

The yoke lever 13 is held in light contact with the lower surface of the lever guide section 36, with a clearance left between the upper surface of the lever guide section 36 (or the bottom of the recess 34) and the yoke lever 13. The clearance has a width x. This clearance remains left when the wiper rubber 2 is deformed to an arcuate shape so as to follow the round contour of a surface to be wiped, as shown in FIG. 9. The clearance thus avoids interference between the yoke lever 14 and the lever guide section 36 which could inhibit pivotal motion of the yoke lever 14.

A space 37 is defined between the secondary lever 12 and the upper surface of the secondary cover 30 and has a width y. The space 37 serves to hold the secondary cover 30 and the secondary lever 12 out of contact with each other when the wiper rubber 2 is downwardly deformed to thereby cause the secondary cover 30 to moved toward the secondary lever 12, as shown in FIG. 9. As such, the secondary lever 12 and the secondary cover 30 will in no way interfere with each other.

Also, the claws 17 are spaced a distance z from the lever guide section 36. This arrangement holds the claws 17 out of contact with the lever guide section 36 during operation of the wiper blade 1 in order not to retard longitudinal movement of the yoke lever 13 through the lever guide section 36.

When the wiper blade 1 is swung over a surface to be wiped, the wiper rubber 2 follows the round contour (curvature) of the surface and is, for example, moved from its initial position as shown in FIG. 8 to deformed position as shown in FIG. 9. At this time, the yoke lever 13 is rotated in a clockwise direction in FIGS. 8 and 9 as the yoke lever 13 is connected to the wiper rubber 2 through the claws 17. Then, the yoke lever 13 downwardly urges the retainer plates 35 of the lever guide section 36 to thereby cause the secondary cover 30 to be pivoted about the connector pins 32 relative to the primary cover 20. Relative position between the primary cover 20 and the secondary cover 30 varies depending on deformation of the wiper rubber 2. As such, the wiper blade 1 in its entirety is deformed to follow the round contour of the surface being wiped.

In the illustrated embodiment, the secondary cover 30 is pivotally connected to the primary cover 20. Also, the yoke lever 13 is inserted through the lever guide section 36 so that the yoke lever 13 is slidably movable in a direction longitudinal of the wiper blade 1 without dropping from the secondary cover 30. This arrangement enables movement of the yoke lever 13 to be transmitted to the secondary cover 30 when the wiper rubber 2 is deformed to follow the round contour of a surface to be wiped. When the wiper rubber 2 is deformed, the secondary cover 30 is so pivoted as to follow such deformation and will not be undesirably lifted relative to movement of the yoke lever 13. According to the present invention, not only the cover assembly 3, but the wiper blade 1 in its entirety is deformable so as to follow the round contour of a surface to be wiped.

The secondary cover 30 is pivoted relative to the primary cover 20 in response to movement of the yoke levers 13. Although the three different types of levers (primary lever 11, secondary levers 12 and yoke levers 13) are arranged in a stepwise fashion, the two types of covers (primary cover 20 and secondary covers 30) in the cover assembly 3 are conveniently conformable to the curvature of a surface to be wiped. There is thus no need to prepare a particular cover for each lever. This feature contributes to a reduction in the number of the required parts and thus, the cost of fabrication.

Figure 10:
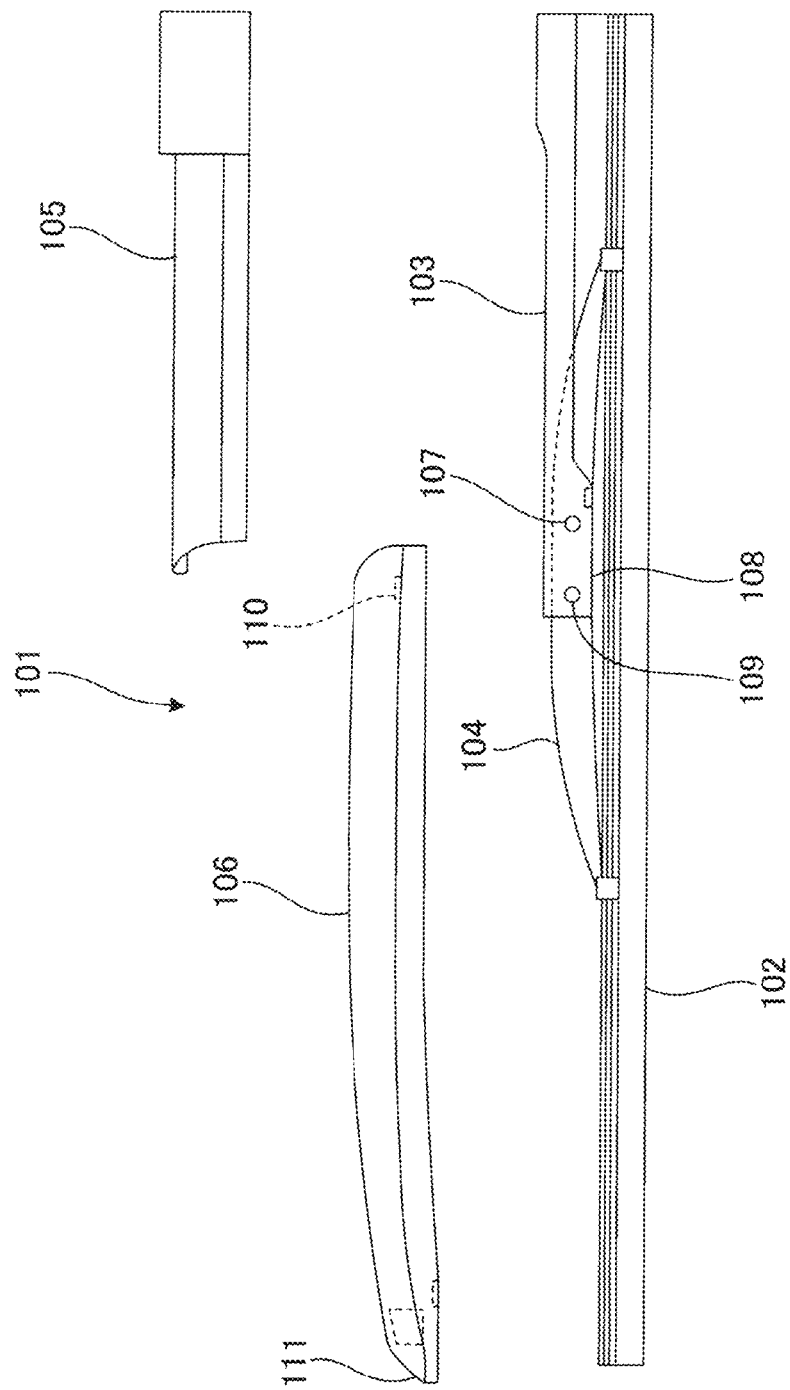
FIG. 10 is an exploded side view, in part, of a conventional wiper blade.

The secondary lever 12 is connected to the primary lever 11. There is thus no need to provide the primary lever 11 (support assembly 3) with any particular structure (for example, extension as shown in FIG. 10) adapted for pivotal connection of the secondary lever 12. Advantageously, any levers used in the existing tournament type wiper blade can be used for the support assembly 3. This enhances the universality of the required parts and thus, brings about a reduction in the cost of fabrication.

In the illustrated embodiment, the apertures 27 are formed in the primary cover 20, and the connector pins 27 are disposed on the secondary cover 30. The present invention is not limited thereto, but any arrangement may be employed as far as the lower cover (secondary cover 30) is pivotally connected to the upper cover (primary cover 20). For example, the primary cover 20 may have connector pins, and the secondary cover 30 may have corresponding apertures.

In the illustrated embodiment, the lever guide section 36 is formed collectively by the inverted U-shaped recess 34 and the retainer plates 35. The present invention is not limited thereto. Any arrangement may be substituted as far as it allows the lower lever (yoke lever 13) to be slidably moved in a direction longitudinally of the wiper blade through the lever guide section 36 so as to transmit movement of the lower lever to the lower cover (secondary cover 30). For example, the rib 33 in the lever guide section may have a through hole.

LIST OF REFERENCE NUMERALS 1 wiper blade
2 wiper rubber
3 support assembly
4 cover assembly
5 vertebra
11 primary lever
12 secondary lever
13 yoke lever
14 connector
15 rivet
16 rivet
17 claw
20 primary cover
21 top of primary cover
22 side walls of primary cover
23 channel of primary cover
24 projection
25 opening
26 connector element
27 aperture
30 secondary cover
31 channel of secondary cover
32 connector pin
33 rib
34 recess
35 retainer plate
36 lever guide section
37 space

The invention claimed is:

1. A wiper blade comprising a wiper rubber for wiping a surface, a support assembly for supporting said wiper rubber and a cover assembly for enclosing at least a part of said support assembly, said support assembly including an upper lever and a lower lever pivotally connected to said upper lever, said cover assembly including an upper cover positioned to enclose at least a part of said upper lever and a lower cover positioned to enclose at least a part of said lower lever, said lower cover comprising a lever guide section through which said lower lever is slidably movable relative to said lower cover in a longitudinal direction defined by said wiper blade during oscillating operation of the wiper blade.

2. The wiper blade according to claim 1, wherein said lower cover is pivotally connected to said upper cover.

3. The wiper blade according to claim 1, wherein said lower lever has one side adjacent to said wiper rubber and an other side remote from said wiper rubber, and said lever guide section has an inner surface, said one side of said lower lever being held in contact with said inner surface of said lever guide section, and said other side of said lower lever being spaced at a predetermined clearance from said inner surface of said lever guide section.

4. The wiper blade according to claim 1, wherein said lower lever includes a distal end and comprises a claw at said distal end, said claw being adapted to hold said wiper rubber and spaced a predetermined distance from said lever guide section.

5. The wiper blade according to claim 1, wherein said lower cover and said support assembly collectively define a space therebetween.

6. The wiper blade according to claim 1, wherein said support assembly comprises a primary lever at a location intermediate a length of said wiper blade and secondary levers pivotally connected to said primary lever and yoke levers pivotally connected to said secondary levers, said primary lever and said secondary levers collectively forming said upper lever, and said yoke levers forming said lower lever.

7. The wiper blade according to claim 1, wherein said wiper blade has a length and opposite longitudinal ends, and said cover assembly comprises a primary cover at a location intermediate a length of said wiper blade, secondary covers located adjacent to said opposite ends of said wiper blade, said primary cover forming said upper cover, and said secondary covers forming said lower cover.

* * * * *